(12) United States Patent
Sabacinski et al.

(10) Patent No.: US 12,124,550 B2
(45) Date of Patent: Oct. 22, 2024

(54) SAFETY HARNESS WITH PSEUDO-CROSSOVER VENTRAL STRAPS

(71) Applicant: 3M INNOVATIVE PROPERTIES COMPANY, St. Paul, MN (US)

(72) Inventors: Richard J. Sabacinski, Charolotte, NC (US); David J. Crouch, South Yorkshire (GB)

(73) Assignee: 3M Innovative Properties Company, St. Paul, MN (US)

( * ) Notice: Subject to any disclaimer, the term of this patent is extended or adjusted under 35 U.S.C. 154(b) by 34 days.

(21) Appl. No.: 18/021,752

(22) PCT Filed: Aug. 13, 2021

(86) PCT No.: PCT/IB2021/057482
§ 371 (c)(1),
(2) Date: Feb. 16, 2023

(87) PCT Pub. No.: WO2022/038478
PCT Pub. Date: Feb. 24, 2022

(65) Prior Publication Data
US 2023/0325482 A1 Oct. 12, 2023

Related U.S. Application Data

(60) Provisional application No. 63/067,120, filed on Aug. 18, 2020.

(51) Int. Cl.
*G06F 21/32* (2013.01)
*G01S 17/66* (2006.01)
(Continued)

(52) U.S. Cl.
CPC .............. *G06F 21/32* (2013.01); *G01S 17/66* (2013.01); *G02B 27/0149* (2013.01);
(Continued)

(58) Field of Classification Search
CPC .......... G06F 21/32; G06F 1/163; G06F 21/35; G01S 17/66; G02B 27/0149; G02B 2027/0167
See application file for complete search history.

(56) References Cited

U.S. PATENT DOCUMENTS

2015/0217145 A1* 8/2015 Teetzel ................... A62B 9/006
359/885
2017/0317911 A1 11/2017 Carr et al.
(Continued)

FOREIGN PATENT DOCUMENTS

WO 2019145886 A1 8/2019

OTHER PUBLICATIONS

International Search report for PCT International Application No. PCT/IB2021/057482 mailed on Nov. 19, 2021, 3 pages.
(Continued)

*Primary Examiner* — Brian A Zimmerman
*Assistant Examiner* — Cal J Eustaquio
(74) *Attorney, Agent, or Firm* — David B. Patchett

(57) ABSTRACT

Apparatuses and methods are disclosed for a wearable proximity detection system. In one embodiment, a wearable device configured to be worn by a wearer includes a first energy source configured to transmit energy; a sensor configured to detect energy from a proximate, second energy source of a compatible, second wearable device; and processing circuitry in communication with the first energy source and the sensor, the processing circuitry configured to use the energy detected by the sensor to determine a predetermined identifying characteristic associated to a second wearer of the second wearable device. In one embodiment, a method includes transmitting, via a first energy source, energy; detecting, via a sensor, energy from a proximate, second energy source of a compatible, second wearable
(Continued)

device; and using, via processing circuitry, the energy detected by the sensor to determine a predetermined identifying characteristic associated to a second wearer of the second wearable device.

15 Claims, 5 Drawing Sheets

(51) Int. Cl.
    *G02B 27/01*     (2006.01)
    *G06F 1/16*      (2006.01)
    *G06F 21/35*     (2013.01)

(52) U.S. Cl.
    CPC .............. *G06F 1/163* (2013.01); *G06F 21/35* (2013.01); *G02B 2027/0167* (2013.01)

(56) References Cited

U.S. PATENT DOCUMENTS

| | | |
|---|---|---|
| 2018/0344246 A1 | 12/2018 | Deluca et al. |
| 2019/0347597 A1 | 11/2019 | Asendorf et al. |
| 2020/0065530 A1 | 2/2020 | Huseth et al. |

OTHER PUBLICATIONS

Schmid, "EnLighting: An Indoor Visible Light Communication System Based on Networked Light Bulbs", 9 pages, Jun. 2016 DOI:10.1109/SAHCN.2016.7732989 Coference: 2016 13th Annual IEEE International Conference on Sensing, Communication, and Networking (SECON).

Schmid, "(In)visible Light Communication: Combining Illumination and Communication", 2 pages, SIGGRAPH '14 ACM SIGGRAPH 2014 Emerging Technologies Jul. 2014 Article No. 13, p. 1.

* cited by examiner

SAFETY HARNESS WITH PSEUDO-CROSSOVER VENTRAL STRAPS

FIELD

The present technology is generally related to a wearable proximity detection system.

BACKGROUND

Identifying individuals in a covert or limited visibility environment can be difficult. For example, when military or law enforcement teams operate in tactical situations, e.g., extraction, special forces operations, warrant prosecution, etc., they are often using respiratory protective device (RPDs, also known as respiratory protective equipment or RPEs) (such as, breathing apparatuses, e.g., self-contained breathing apparatuses (SCBA), and/or respirators and/or filters, e.g., multi-functional respirators, powered air purifying respirators (PAPR), etc.) in a low light, confined space and other limited visibility environments. For example, military teams may use pyrotechnics that emit smoke and sounds to confuse adversaries, or may be assigned to operate in a hostile Chemical, Biological, Radiological and Nuclear (CBRN) environment. When operating under such restrictive conditions, one of the key problems encountered by military/law enforcement personnel is that of accurately distinguishing between themselves, e.g., other team members, and potential adversaries or victims.

As another example, accountability of personnel during an emergency situation, such as a fire, can be a very difficult but critical task. When firefighters enter a burning building or forest fire, keeping track of them can be difficult, and being able to locate lost personnel quickly can be the difference between life and death.

SUMMARY

The techniques of this disclosure generally relate to a wearable proximity detection system. Some embodiments of the present disclosure may be used by personnel to e.g., be able to quickly distinguish between other members of their team, victims and potential adversaries/hostiles. Some embodiments of the present disclosure may be used by personnel to e.g., identify and locate personnel in limited visibility environments. Some embodiments may be integrated into equipment and/or uniforms typically worn by such personnel.

In one aspect of the present disclosure, a wearable device configured to be worn by a wearer is provided. The wearable device includes a first energy source configured to transmit energy; a sensor configured to detect energy from a proximate, second energy source of a compatible, second wearable device; and processing circuitry in communication with the first energy source and the sensor, the processing circuitry configured to use the energy detected by the sensor to determine a predetermined identifying characteristic associated to a second wearer of the second wearable device.

In some embodiments of this aspect, the first energy source and the second energy source are configured to transmit at least one of electromagnetic (EM) radiation, near infrared (IR) light, ultraviolet (UV) radiation and ultrasonic waves. In some embodiments of this aspect, the wearable device is a respiratory protective device. In some embodiments of this aspect, the predetermined identifying characteristic corresponds to a predetermined energy emission signature associated to the second wearer of the second wearable device. In some embodiments of this aspect, the first energy source is configured to transmit the energy across a 360 degree range relative to the wearer of the wearable device.

In some embodiments of this aspect, the wearable device further includes a display in communication with the processing circuitry; and the processing circuitry is configured to use the energy detected by the sensor to determine the predetermined identifying characteristic by being configured to convert the energy detected by the sensor into an image on the display, the image on the display allowing the wearer to visually determine whether the image resembles the predetermined identifying characteristic. In some embodiments of this aspect, the image on the display is configured to visually distinguish the second wearer from a non-wearer of compatible, wearable devices within a limited visibility environment. In some embodiments of this aspect, the display is a heads-up display.

In some embodiments of this aspect, the wearable device is at least part of an emergency responder uniform and the wearable device further comprises a retroreflective article embedded with a personal identification associated to the wearer. In some embodiments of this aspect, the predetermined identifying characteristic associated to the second wearer corresponds to a second personal identification embedded into a second retroreflective article affixed to the second wearable device. In some embodiments of this aspect, the second energy source comprises the second retroreflective article affixed to the second wearable device; and the sensor is configured to detect energy from the proximate, second energy source by being configured to: detect reflected energy, the reflected energy resulting from the energy transmitted from the first energy source and reflected by the second retroreflective article.

In some embodiments of this aspect, the wearable device further includes a transmitter in communication with the processing circuitry. The processing circuitry is configured to use the energy detected by the sensor to determine the predetermined identifying characteristic by being configured to convert the energy detected by the sensor to a personal identification, associate the personal identification to at least one of a time that the energy is detected by the sensor, a date that the energy is detected by the sensor, and a location of the wearable device during the time that the energy is detected by the sensor. The transmitter is configured to wirelessly transmit the personal identification and the associated at least one of the time, the date and the location to a database.

In some embodiments of this aspect, the wearable device further includes an orientation sensor in communication with the processing circuitry, the orientation sensor configured to detect an orientation of the second wearable device relative to the wearable device. The processing circuitry is further configured to: associate the personal identification to the orientation detected by the orientation sensor when the energy is detected by the sensor; and cause the transmitter to transmit the orientation along with the personal identification and the associated at least one of the time, the date and the location to the database.

According to another aspect of the present disclosure, a method for a wearable device configured to be worn by a wearer is provided. The method includes providing a wearable device having a first energy source, a sensor and processing circuitry; transmitting, via the first energy source, energy; detecting, via the sensor, energy from a proximate, second energy source of a compatible, second wearable device; and using, via the processing circuitry, the energy detected by the sensor to determine a predetermined identifying characteristic associated to a second wearer of the second wearable device.

In some embodiments of this aspect, transmitting the energy further comprises transmitting at least one of electromagnetic (EM) radiation, near infrared (IR) light, ultraviolet (UV) radiation and ultrasonic waves; and detecting the energy further comprises detecting at least one of electromagnetic (EM) radiation, near infrared (IR) light, ultraviolet (UV) radiation and ultrasonic waves. In some embodiments of this aspect, the wearable device is a respiratory protective device. In some embodiments of this aspect, the first energy source and the second energy source are configured to transmit to a same predetermined energy emission signature, the predetermined energy emission signature representing the predetermined identifying characteristic. In some embodiments, using the energy detected by the sensor to determine the predetermined identifying characteristic further includes converting the energy detected by the sensor into an image; displaying the image on a display comprised in the wearable device to allow the wearer to visually determine whether the image resembles the predetermined identifying characteristic, the image on the display and the predetermined identifying characteristic being configured to visually distinguish the second wearer from a non-wearer of compatible, wearable devices within a limited visibility environment.

In some embodiments of this aspect, the wearable device is at least part of an emergency responder uniform and the wearable device further includes a retroreflective article embedded with a personal identification associated to the wearer. In some embodiments of this aspect, the second energy source includes the second retroreflective article affixed to the second wearable device. In some embodiments, the detecting the energy from the proximate, second energy source further includes detecting reflected energy, the reflected energy resulting from the energy transmitted from the first energy source and reflected by the second retroreflective article. In some embodiments, using the energy detected by the sensor to determine the predetermined identifying characteristic further includes converting the energy detected by the sensor to a personal identification; associating the personal identification to at least one of a time that the energy is detected by the sensor, a date that the energy is detected by the sensor, a location of the wearable device during the time that the energy is detected by the sensor and an orientation of the second wearable device relative to the wearable device when the energy is detected by the sensor; and transmitting the personal identification and the associated at least one of the time, the date, the location and the orientation to a database.

According to yet another aspect of the present disclosure, a system is provided. The system includes a wearable device configured to be worn by a wearer. The wearable device includes a first energy source configured to transmit energy in a form of at least one of electromagnetic (EM) radiation, near infrared (IR) light, ultraviolet (UV) radiation and ultrasonic waves; a sensor configured to detect energy from a proximate, second energy source of a compatible, second wearable device, the first energy source and the second energy source being configured to transmit a same predetermined energy emission signature, the predetermined energy emission signature representing the predetermined identifying characteristic; a heads-up display in communication with the processing circuitry; and processing circuitry in communication with the first energy source, the sensor and the heads-up display. The processing circuitry is configured to use the energy detected by the sensor to determine a predetermined identifying characteristic associated to a second wearer of the second wearable device; convert the energy detected by the sensor into an image; and display the image on the display to allow the wearer to visually determine whether the image resembles the predetermined identifying characteristic, the image on the display and the predetermined identifying characteristic being configured to visually distinguish a second wearer of the second wearable device from a non-wearer of compatible, wearable devices within a limited visibility environment.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
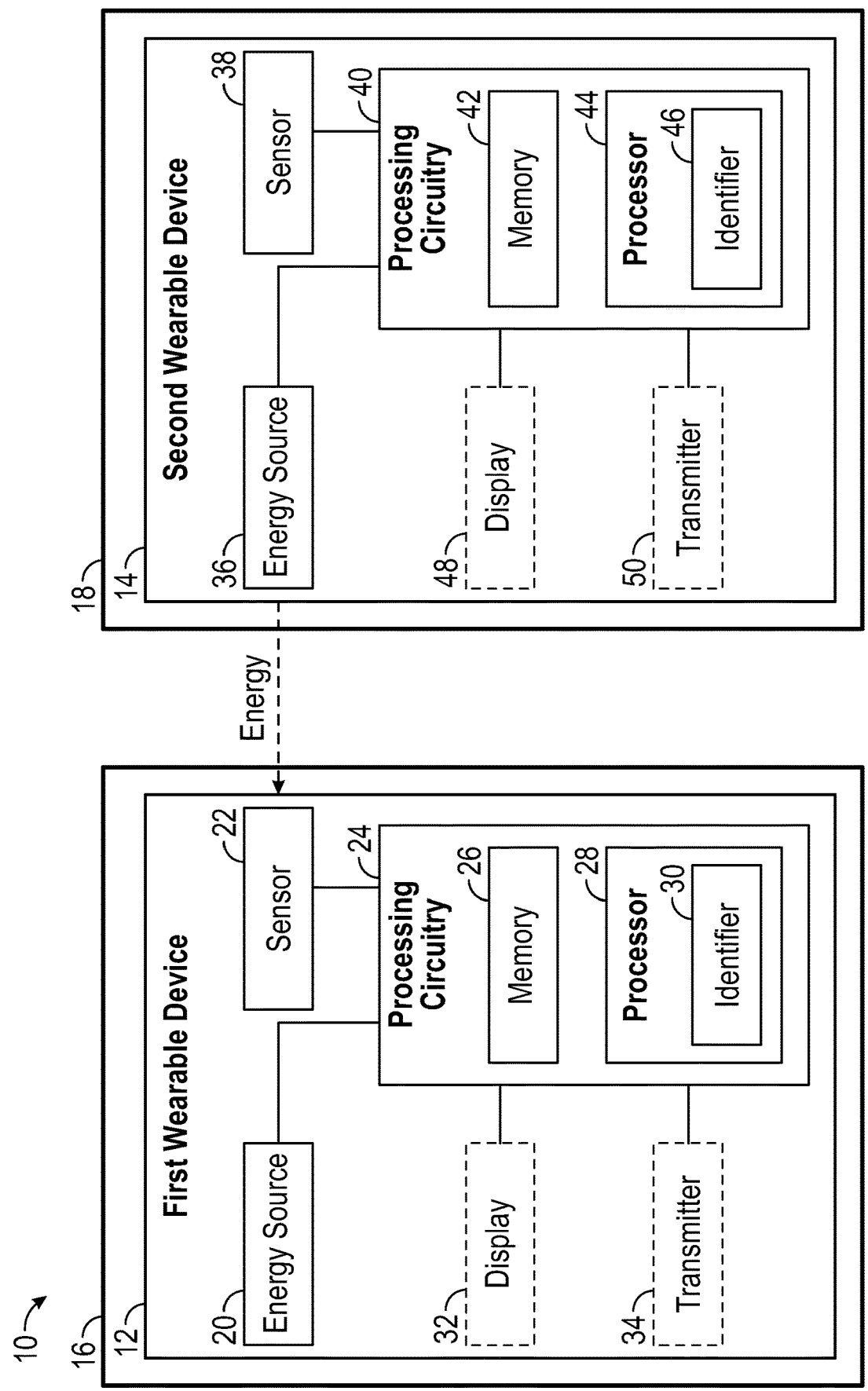
FIG. 1 is a block diagram that illustrates an example wearable proximity detection system according to one embodiment of the present disclosure.

Over recent years there has been an increase in the purchase of respiratory protective devices because specialist law enforcement and defense agencies have increasingly become familiar with their benefits. Some embodiments of the present disclosure provide for a tactical respiratory protective device with a covert situational awareness sensor and/or display built-in. Some embodiments may be integrated into body armor and/or helmets for defense and security personnel.

Some embodiments of the present disclosure may include an emitter and sensor array integrated into the respiratory protective device unit (such as, breathing apparatuses, e.g., self-contained breathing apparatuses (SCBA), and/or respirators and/or filters, e.g., multi-functional respirators, powered air purifying respirators, etc.), which may reduce individual reaction times in dynamic and hostile environments by allowing it to be easier to distinguish between, e.g., a friend and a foe.

Such a respiratory protective device unit may advantageously provide individual life support, its primary function, but may also provide functionality as a sensor station for personal identification under such hostile conditions. Some embodiments of the present disclosure may provide for increasing situational awareness and therefore allowing improved decision making at the tactical level.

Some embodiments provide a tactical respiratory protective device (e.g., self-contained breathing apparatus (SCBA) or Powered Air Purifying Respirator (PAPR)) system which can emit discrete forms of electro-magnetic radiation (e.g., near infrared (IR) or ultra violet (UV) light) from a front and rear facing emitter array included in or connectable to the respiratory protective device, such as with an SCBA or PAPR back frame. Some embodiments provide 360 degree sensor coverage. Such tactical RPD unit may enable other similarly equipped operatives to covertly detect each other through a heads-up display/sensor unit mounted in the corresponding RPD facepiece. This technology may enable such RPD wearers to distinguish between themselves and other non-emitting entities, such as casualties or adversaries in low light or smoke-filled environments. Some embodiments may advantageously provide increased situational awareness capabilities for law enforcement and defense related applications.

Some embodiments may increase the safety of emergency responders and workers by providing for an accountability feature through proximity. For example, some embodiments may provide a system by which a validated record is kept in a form that it can be searched, and the results analyzed and used to expedite a search for a missing party. For example, such embodiments may be used to provide proximity information during an emergency situation (e.g., "Lt. Smith, we are not getting a response from firefighter Jones. You were next to him less than a minute ago. Turn to your right and see if you can locate him.") Such a system may be useful not only in a fire fighting scenario, but may also be useful in other confined spaces ranging from manways and tunnels to large tanks, e.g., anywhere keeping track of personnel may be critical.

Some embodiments of the present disclosure provide for a light emitting diode (LED) and/or communication/illumination system that is dispersed on an emergency responder or other worker uniform, a receiver device located on the emergency responder or other worker that reads the communication/illumination information from other emergency responders and workers and a computer or other logic engine that reads the communication and confirms the communications from a plurality of the illuminated LEDs. In some embodiments, the computer may further analyze the communication, compare the communication with a data table to confirm the identity of the other emergency responders or workers and may log the date and time of the observation in a database. Further, the database may be configured with a search capability that can provide information regarding e.g., the last time a responder or worker was seen and by whom.

Before describing in detail exemplary embodiments, it is noted that the embodiments reside primarily in combinations of apparatus components and processing steps related to a wearable proximity detection system. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the term "compatible" is used and may indicate that a device is configured to detect energy emitted or reflected from one or more other like devices and interpret the detected energy according to the principles of the present disclosure.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures, in which like elements are referred to by like reference numerals, there is shown in FIG. 1 a schematic diagram of a wearable proximity detection system 10, according to an embodiment, constructed in accordance with the principles of the present disclosure. The system 10 in FIG. 1 is a non-limiting example and other embodiments of the present disclosure may be implemented by one or more other systems. Referring to FIG. 1, system 10 includes a first wearable device 12 and a second wearable device 14, which may be attached to a first article 16 and a second article 18, respectively. In some embodiments, the articles 16, 18 may be equipment, such as, a self-contained breathing apparatus (SCBA). In other embodiments, the articles 16, 18 may be a garment, such as an emergency responder uniform. Note that although only two wearable devices 12 and 14 are shown for convenience, the system 10 may include many more like wearable devices.

The first wearable device 12 includes an energy source 20, a sensor 22, processing circuitry 24 and memory 26. The processing circuitry 24 may include one or more processors 28 and memory, such as, the memory 26. In particular, in addition to a traditional processor and memory, the processing circuitry 24 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 28 may be configured to access (e.g., write to and/or read from) the memory 26, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the first wearable device 12 may further include software stored internally in, for example, memory 26. The software may be executable by the processing circuitry 24. The processing circuitry 24 may be configured to control any of the methods and/or processes described herein and/or to cause such methods, and/or processes to be performed, e.g., by the first wearable device 12. The memory 26 is configured to store data, programmatic software code and/or other information described herein. In some embodiments, the software may include instructions stored in memory 26 that, when executed by the processor 28 and/or an identifier 30, causes the processing circuitry 24 and/or configures the first wearable device 12 to perform the processes described herein with respect to the first wearable device 12 (e.g., processes described with reference to FIG. 5 and/or any of the other figures). The identifier 30 may be configured to cause the first wearable device 12 to: transmit, via the energy source 20, energy; detect, via the sensor 22, energy from a proximate, second energy source of a compatible, second wearable device 14; and use, via the processing circuitry 24, the energy detected by the sensor 22 to determine a predetermined, identifying characteristic associated to a wearer of the second wearable device 14.

In some embodiments, the first wearable device 12 includes a display 32 and/or a transmitter 34. The display 32 may be any type of electronic display (e.g., LED, OLED, LCD, heads-up display for presentation on the inside of a mask, etc.) configured to display images according to the principles of the present disclosure. The transmitter 34 may be any type of transmitter/transceiver configured to transmit/receive radio signals according to the principles of the present disclosure. In some embodiments, the first wearable device 12 may not include a transmitter 34 or a display 32.

The second wearable device 14 includes an energy source 36, a sensor 38, processing circuitry 40 and memory 42. The processing circuitry 40 may include one or more processors 44 and memory, such as, the memory 42. In particular, in addition to a traditional processor and memory, the processing circuitry 40 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) the memory 42, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the second wearable device 14 may further include software stored internally in, for example, memory 42. The software may be executable by the processing circuitry 40. The processing circuitry 40 may be configured to control any of the methods and/or processes described herein and/or to cause such methods, and/or processes to be performed, e.g., by the second wearable device 14. The memory 42 is configured to store data, programmatic software code and/or other information described herein. In some embodiments, the software may include instructions stored in memory 42 that, when executed by the processor 44 and/or an identifier 46, causes the processing circuitry 40 and/or configures the second wearable device 14 to perform the processes described herein with respect to the second wearable device 14. The identifier 46 may be configured to cause the second wearable device 14 to: transmit, via the energy source 36, energy; detect, via the sensor 38, energy from a proximate, second energy source of another compatible/like wearable device; and use, via the processing circuitry 40, the energy detected by the sensor 38 to determine a predetermined, identifying characteristic associated to a wearer of the another wearable device.

In some embodiments, the second wearable device 14 includes a display 48 and/or a transmitter 50. The display 48 may be any type of electronic display (e.g., LED, OLED, LCD, heads-up display for presentation on the inside of a mask, etc.) configured to display images according to the principles of the present disclosure. The transmitter 50 may be any type of transmitter/transceiver configured to transmit/receive radio signals according to the principles of the present disclosure. In some embodiments, the second wearable device 14 may not include a transmitter 50 or a display 48.

Although FIG. 1 shows identifiers 30 and 46, as being within a respective processor, it is contemplated that these elements may be implemented such that a portion of the elements is stored in a corresponding memory within the processing circuitry. In other words, the elements may be implemented in hardware or in a combination of hardware and software within the processing circuitry.

Having described examples of hardware and software arrangements for implementing the processes and functions of the disclosure, the sections below provide details and examples of arrangements for a wearable proximity detection system, according to some embodiments of the present disclosure.

Figure 2:
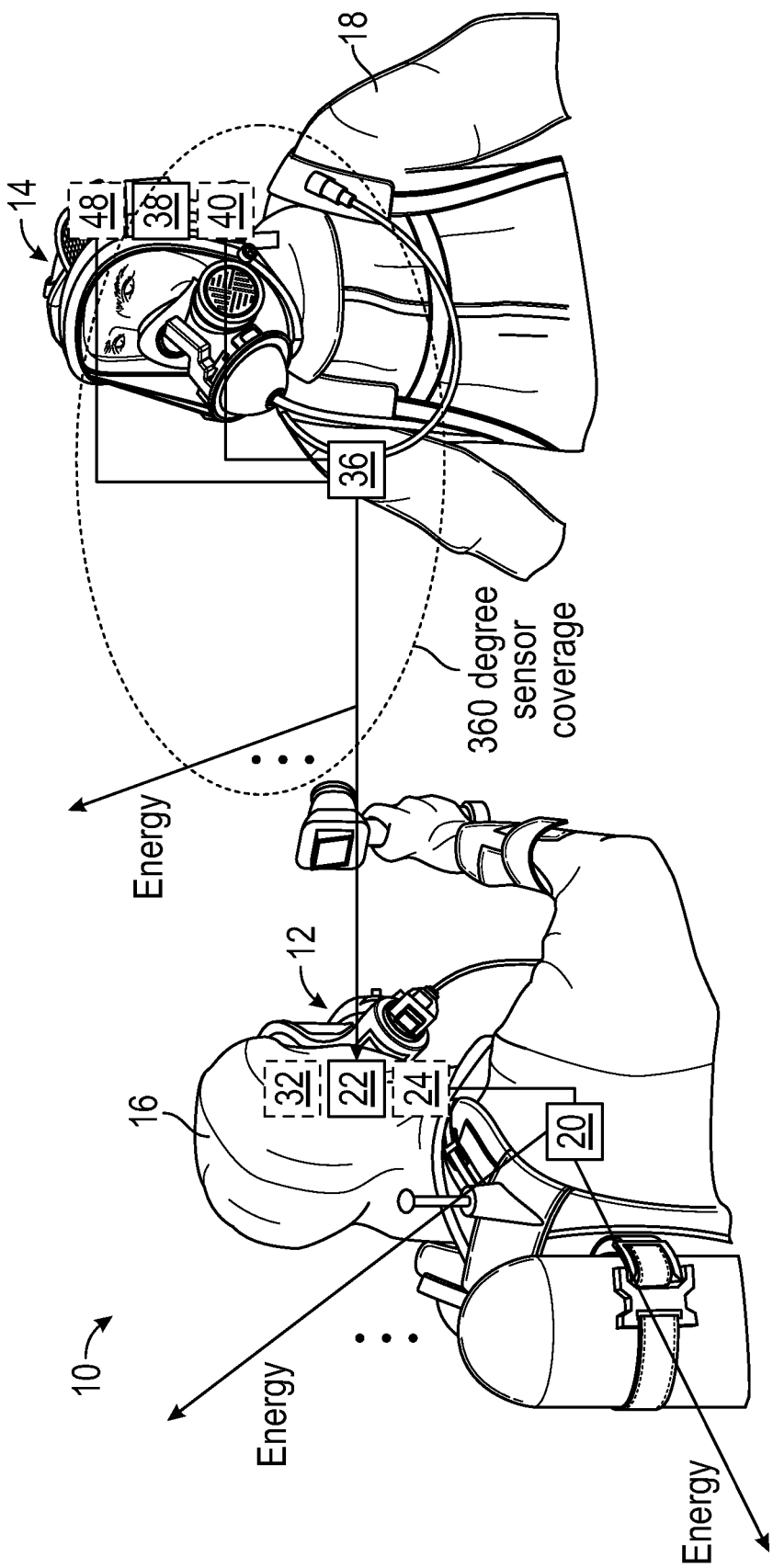
FIG. 2 is a schematic diagram that illustrates the wearable proximity detection system implemented as a tactical self-contained breathing apparatus (SCBA) with a covert situational awareness sensor and display system according to one embodiment of the present disclosure.
Figure 3:
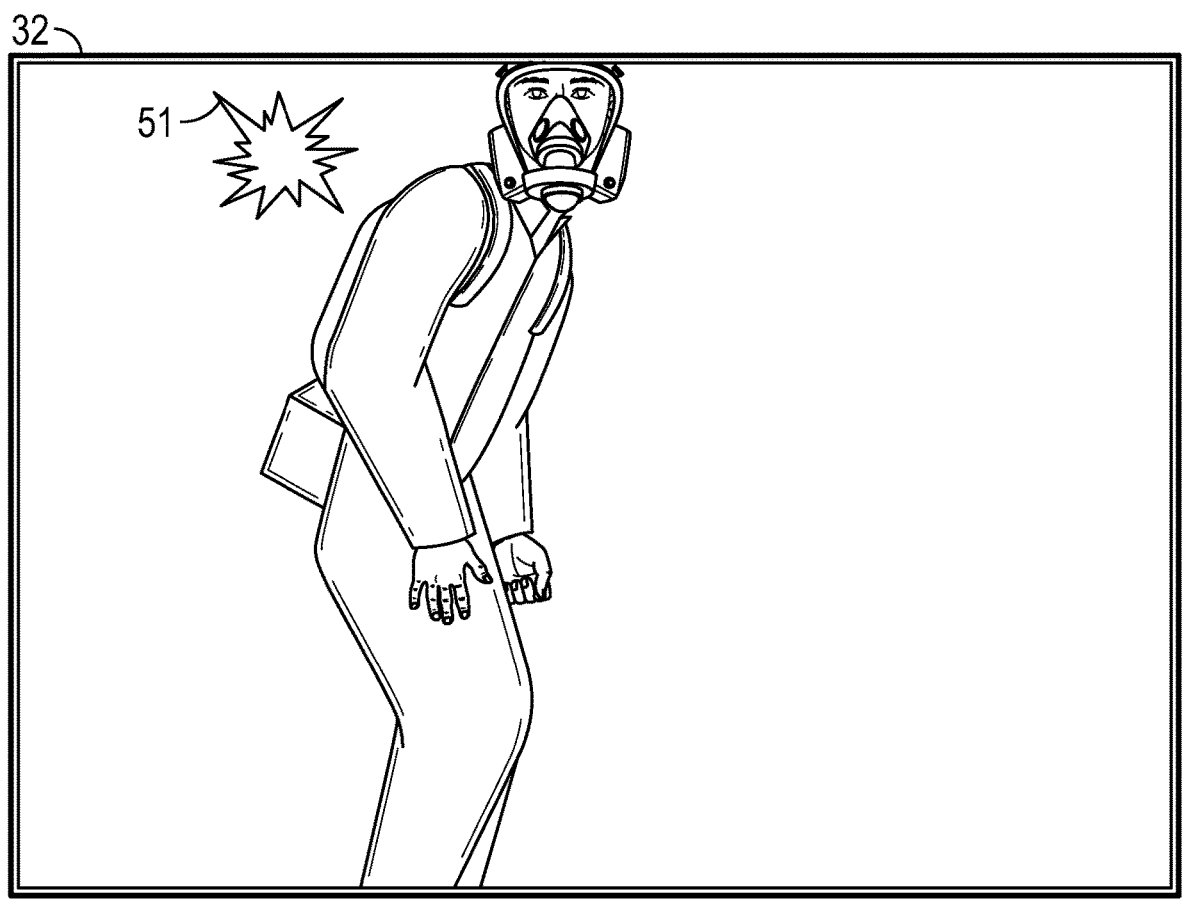
FIG. 3 illustrates an example heads-up display image according to one embodiment of the present disclosure.
Figure 4:
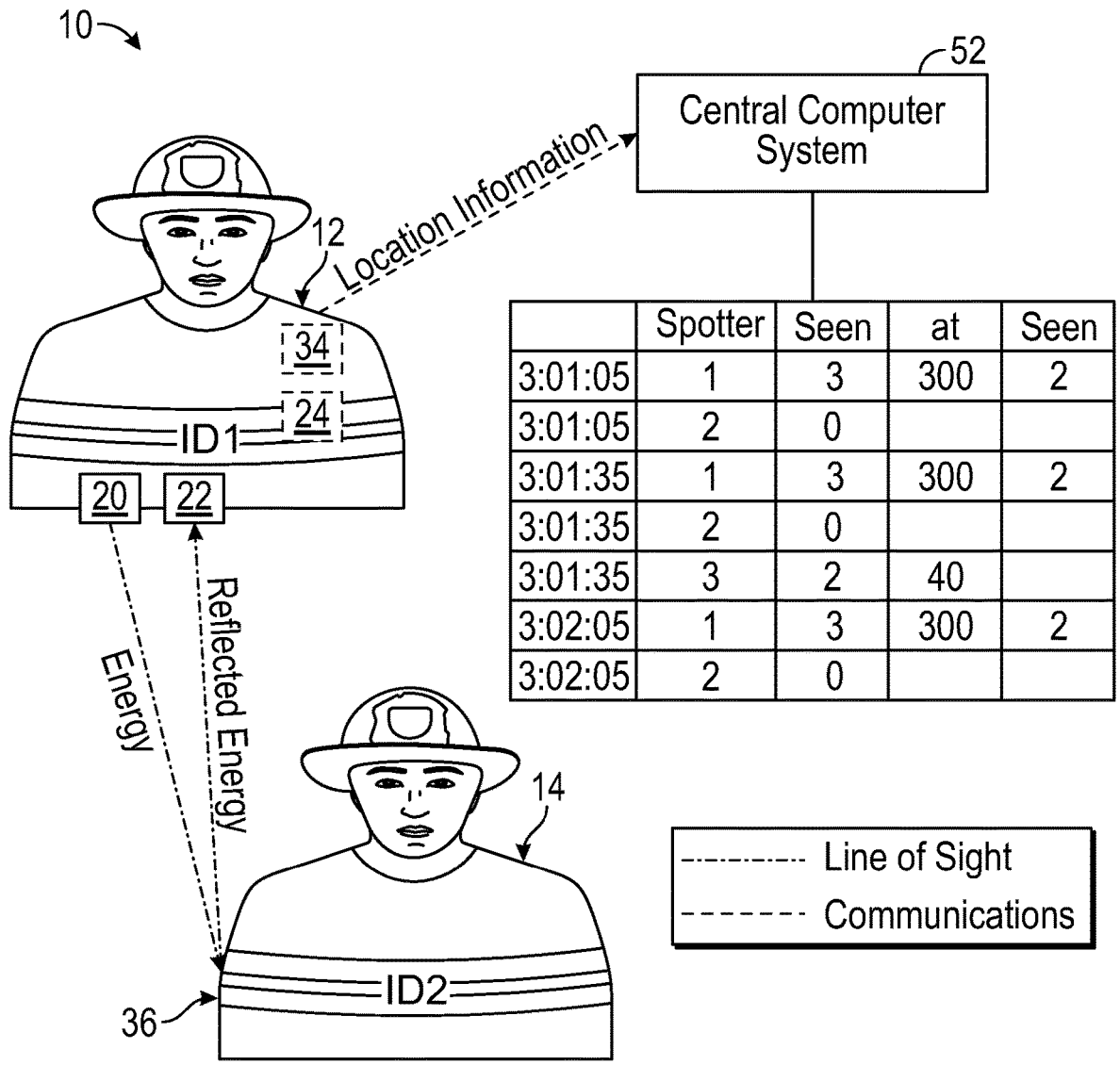
FIG. 4 is a schematic diagram that illustrates the wearable proximity detection system implemented as a communications proximity accountability system for emergency responders according to one embodiment of the present disclosure.

It should be noted that FIGS. 2-4 show example implementations of the wearable devices 12, 14 introduced in FIG. 1 and that, for the sake of clarity, not all the hardware components of the wearable devices 12, 14 are shown in FIGS. 2-4; even though they may be present.

Referring now primarily to FIGS. 2 and 3, a wearable proximity detection system 10 implemented as a tactical self-contained breathing apparatus (SCBA) system is described according to one embodiment of the present disclosure. It should be noted that the SCBA implementation shown in FIGS. 2 and 3 is a non-limiting example of one type of RPD that may be used. Other embodiments may be implemented in other types of RPDs/RPEs, such as, for example, multifunctional respirators (e.g., GSReS™, First Response Respirator (FRR)™, AV-3000™) or a PAPR or air purifying respirator (APR). The system 10 includes a first wearable device 12 and a second wearable device 14, implemented as SCBAs that can emit energy e.g., in the form of a predetermined energy emission signature. For example, the energy sources 20 and 36 from each respective wearable device 12 and 14 may be configured to emit discrete forms of electro-magnetic radiation (e.g., Near Infra-Red IR), or Ultraviolet (UV) light). In some embodiments, the energy may be emitted in other forms, such as, for example, ultrasound waves. The energy sources 20, 36 of each respective wearable device 12 and 14 may be implemented as front and rear facing emitter arrays attached or otherwise integrated with the RPD back frame. By providing both a front and rear facing emitter array, a 360 degree sensor coverage, the tactical RPD unit is configured to enable other similarly equipped operatives to covertly detect each other through e.g., a display 32 (e.g., heads-up display/sensor unit mounted in the corresponding RPD facepiece).

FIG. 3 shows an example of an image on the display 32 showing an image of a person via, e.g., a view of a thermal imager or night-vision camera, in which the wearer of the first wearable device 12 is able to view the energy emission signature resulting from emissions from the front and rear facing emitter arrays (energy source 36) of another operative/wearer of the second wearable device 14. Due to the energy emission signature hovering over the person shown in the in-mask display 32, the wearer of the first wearable device 12 is able to quickly discern that the person is a friendly (and not a foe). The sensor 22 may be configured to detect the energy emission signature and the processing circuitry 24 may be configured to convert/process the energy detected by the sensor 22 into the image on the display 32. On the other hand, if the person shown in the in-mask display 32 did not have the energy emission signature hovering over the image, the wearer of the first wearable device 12 would be able to quickly discern that the person may not be a friendly. This may assist with decreasing reaction times in a dynamic and hostile environment.

Although not shown, the wearer of the second wearable device 14 should likewise be able to view the energy emission signature in his/her respective in-mask, display 48 as a result of emissions from the front and rear facing emitter arrays (energy source 20) of the first wearable device 12. In this manner, all team members wearing these wearable devices may be able to more quickly (e.g., as compared to existing night-time vision systems) visually identify/discern a friendly (as opposed to an adversary) in a limited visibility environment. Stated another way, this technology may enable such RPD wearers to distinguish between themselves and other non-emitting entities such as casualties or adversaries in a low light, or smoke-filled environments, such as with law enforcement and defense related applications.

Note that although FIG. 2 shows only two wearable devices, there may be any number of wearable devices in the system. Additionally, some embodiments of the tactical RPD may have one or more the following features:

1) Tactical RPD unit with non-reflective surfaces suitable for:
   a. covert air pressure alarm system (heads-up display warning);
   b. capable of accepting a range of air cylinders up to 60 minutes duration (300 and 379 bar variants);
   c. ergonomically designed power supply unit;

2) Front and rear mounted electro-magnetic radiation (EMR) emitter array (e.g., UV or near IR) allowing for a 360 degree sensing coverage;

3) Respirator mounted sensing unit (UV or near IR, e.g., Scott™ sight type arrangement) capable of detecting the output from the front and rear mounted emitter arrays; and/or 4) Respirator mounted heads-up display unit to enable outputs from the emitter arrays and the sensing units described above to be displayed.

For example, a respirator mounted heads-up display (e.g., a Scott™ Sight adaptation) may enable the RPD wearer to see a thermal picture of any casualty or adversary and at the same time allow differentiation between these people and fellow tactical operatives, due to the pulsing EMR being emitted and detected from another sensing tactical RPD unit, according to the principles provided in the present disclosure.

The energy emission signature may be provided in many forms, such as pulsing, colored, accompanied by an audio alert, etc. and is preferably designed to allow the wearer to more quickly distinguish between a friendly and a foe in a hostile environment.

Referring now primarily to FIG. 4, another example wearable proximity detection system 10 implemented as an accountability system is described according to another embodiment of the present disclosure. Global Positioning Satellite (GPS) driven systems may be useful until they get out of reach of the satellite—a recognized problem when dealing with interior firefighting. Radio signals and other forms of radiation may either be absorbed or modified by fire conditions or bounce around and provide misleading information during interior operations. Thus, some embodiments of the present disclosure may provide a system configured for accountability by proximity, which may use each individual team member, e.g., each individual firefighter, as a focal point or node around which other team members may be tracked.

The example system 10 is shown in FIG. 4 with two wearable devices 12 and 14. Only two are shown for simplicity; however, it should be understood that many more wearable devices may be included in the system. The wearers are both in line of sight of each other. Each individual is wearing one wearable device 12 or 14, including one or more retroreflective panels embedded with an identifying characteristic, e.g., with an embedded identification symbol, unique to each individual (e.g., ID1 for the wearer of wearable device 12 and ID2 for the wearer of wearable device 14). The symbols may also capture additional information such as the functional unit that the wearer belongs to (e.g., Engine Co. 2). In some embodiments, the embedded identification symbol may be a printed part of the retroreflective panel (shown in FIG. 4 as a horizontally stripped retroreflective panel across the wearer's top). In some embodiments, the identification symbol may be in the form of a hardened transparent panel such as an LED with a cover made of high temperature glass. This may allow for a good flexibility in the assignment of individuals. In yet other embodiments, the identification symbol may be in other forms as well.

Each individual may also be wearing at least one and preferably a plurality of devices (e.g., energy sources 20, 36) having a source of electromagnetic radiation of a form that can be reflected by the retroreflective panel. In some embodiments, the retroreflective panel may be considered an energy source in that energy is reflected off of the retroreflective panel towards another wearer. Multiple energy sources disposed on each wearer may provide a broader vista with a more complete view of the individuals working in the area. In some embodiments, the energy may be in the form of visible light, infrared (IR) or ultraviolet (UV) light or a combination thereof.

The electromagnetic radiation emitted by the energy sources 20, 36 of the wearable devices 12, 14 are shown by the dashed lines in FIG. 4. In the example scenario, the energy source 20 emits electromagnetic radiation, which is reflected by the retroreflective panel on the second wearer of the second wearable device 14 back to the sensor 22 on the first wearable device 12. The retroreflective panel may be considered a type of energy source 36 on the second wearable device 14. The electromagnetic radiation reflected from the retroreflective panel carries with it the identification information of the individual "seen", in this example ID2/second wearer. This identification information along with the time and/or date of observation and the orientation (from e.g., a three-axis digital magnetometers—or similar e-compass type device) may be captured in a database, which may be a central computer system 52, e.g., a laptop with the fire supervisory personnel outside the fire but on the fire scene. In some embodiments, the information may further include location information, such as, for example, a distance between the spotter and the spotted. The processing circuitry 24 may be configured to process the energy detected by the sensor 22 and determine a distance between the energy source 20 on the first wearable device 12 and the retroreflective panel on the second wearable device 14. In some embodiments, the wearable device 12 may include a transmitter 34 configured to transmit, e.g., via radio communication signals, the information to the central computer system 52.

In some embodiments, each of the wearable devices 12, 14 may automatically register the presence of the retroreflective panels that it detects and captures the corresponding identification information. The worn wearable devices 12, 14 may be in communication with the central computer system 52, or other similar device, which receives all the identification and orientation information and facilitates an analysis thereof.

The communications system underlying the energy emission system, e.g., an LED lighting system, may utilize width modulation or any of a number of other techniques. In some embodiments, the analysis and computation may be performed either on the worn wearable devices 12, 14 or on another processing device, such as the central computer system 52.

In some embodiments, the wearable devices 12, 14 may include a visual display (e.g., display 32) that may show the direction of a user as prompted via the display, either by the user wearing the device (e.g., wearable device 12, 14), or by the fire supervisory personnel operating the computer system 52. Performing an analysis, at least in part in the worn wearable devices 12, 14, may allow for use of the system even if it is disconnected from communicating with the central computer system 52. For example, the processing circuitry 24, 40 (not shown) on one or more of the respective wearable devices 12, 14 may be configured to receive, collect, store and process the information from other wearable devices.

It should be noted that although the system 10 may be designed and implemented to operate continuously, some embodiments may provide that the wearable devices 12, 14 "sample" the area around each wearer periodically, rather than continuously, such as every 10 seconds or thereabouts. This may assist with conserving power. Generally, standard cylinder sizes only allow 15 to 30 minutes of active work on air and losing track of someone in an immediately dangerous to life or health (IDLH) environment is dangerous.

FIG. 4 also shows an example of a table/matrix including the tracking/proximity information described above, which may be included in a database (e.g., computer system 52) according to one embodiment of the present disclosure. The example table includes information regarding the firefighter, when last seen and at what angle relative to an individual identified as the spotter. For example, the table shows, for each time stamp, the identification number of the spotter, the individuals being spotted or "seen" and the orientation of the individual being seen (relative to the spotter). One simplified example of the data captured is: "Joe (ID3) was spotted by Harry (ID1) at 3:01:05 to Joe's left (300 degrees)." In some embodiments, because the system uses line of sight (LOS) and electromagnetic radiation, the visibility may be limited, generally to a matter of 1-5 meters, possible more in some circumstances.

In some embodiments, if a mesh networking radio system is deployed on the scene as well (e.g., Scott™ electronic management system (SEMS™)), the received signal strength indicator (RSSI) value between the individuals can be captured and integrated into a database (e.g., a databased within computer system 52) in order to provide a quantitative location, i.e., "last seen three minutes ago two meters to the left of . . . ".

In some embodiments, the accountability element of the system 10 may be from the database search capability. The database captures identification of the firefighters seen, firefighters that saw them, time of last observation, proximate direction of line of sight, etc. If, for example, a firefighter does not or stops answering his/her radio calls, calls a mayday or fails an electronic PAR (E-PAR), the fire officer may simply interrogate/search the database (e.g., using the lost fire fighter's ID or other identifier as a search parameter) for the last confirmed sighting of such lost firefighter. That may provide the identification of the last firefighters that "saw" the lost firefighter and also indicate the time the lost firefighter was last seen and their relative orientation (e.g., two minutes ago to your left). The firefighter that most recently "saw" the lost firefighter may then be alerted and may be able to backtrack a few steps to the most recent sighting location and begin looking for the lost firefighter, if not already located.

In some embodiments, the relative positioning may be improved with the use of small LED emitters that are placed by the users around the fire scene as they enter the fire space. These LED emitters may provide light and communicate identification data which may also be entered into or communicated to the database (e.g., central computer system 52).

In some embodiments, the proximity information may also be extremely useful in post incident/post operational analysis. The data can be overlaid on building or equipment design using publicly available software showing paths taken, deployment of individuals and utilization of resources. The data can be further entered into a software package for display in virtual or augmented reality optics. It may be possible to perform an accident investigation by walking through the incident zone, "seeing" proxies of the users in the virtual realm.

In some embodiments, the LEDs as discussed so far may include a white light. However, the system 10 may function with LEDs of different colors, or combinations of colors. For example, for security purposes, the LEDs and the readers and receivers (e.g., sensors 22, 38) can operate in the infrared or ultraviolet regions. For fire (smoke penetration), the LEDs may operate in infrared, red or green. Industrial LEDs may be yellow (to differentiate from other lighting used in the area, for example, power lights for a fixed instrument controller). Additionally, by using multi-color LEDs additional data may be embedded in the visual stream.

Figure 5:
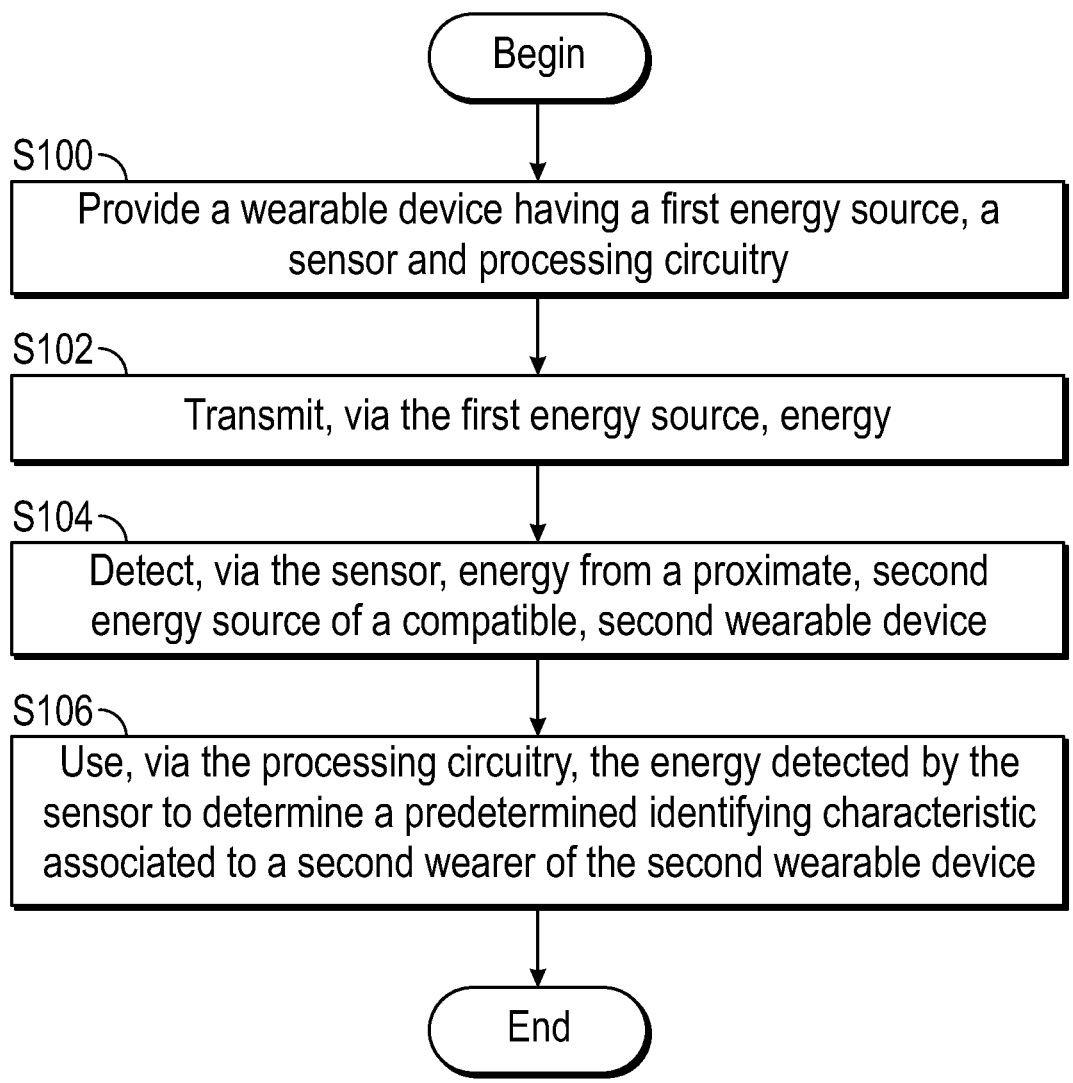
FIG. 5 is a flowchart of an example method for a wearable device according to one embodiment of the present disclosure.

FIG. 5 is a flowchart of an example process in a wearable device 12 according to some embodiments of the present disclosure. One or more Blocks and/or functions and/or methods performed by the wearable device 12 may be performed by one or more elements of the wearable device 12 such as by identifier 30 in processing circuitry 24, memory 26, processor 28, sensor 22, energy source 20, display 32 and transmitter 34, etc. according to the example process/method. The example process includes, in step S100, providing a wearable device 12 having a first energy source 20, a sensor 22 and processing circuitry 24. The process includes, in step S102, transmitting, via the first energy source 20, energy. The process includes, in step S104, detecting, via the sensor 22, energy from a proximate, second energy source of a compatible, second wearable device 14. The process includes, in step S106, using, via the processing circuitry 24, the energy detected by the sensor 22 to determine a predetermined identifying characteristic associated to a second wearer of the second wearable device 14.

In some embodiments, transmitting the energy further includes transmitting at least one of electromagnetic (EM) radiation, near infrared (IR) light, ultraviolet (UV) radiation and ultrasonic waves; and detecting the energy further includes detecting at least one of electromagnetic (EM) radiation, near infrared (IR) light, ultraviolet (UV) radiation and ultrasonic waves. In some embodiments, the wearable device 12 is a self-contained breathing apparatus (SCBA). In some embodiments, the first energy source 20 and the second energy source 36 are configured to transmit to a same predetermined energy emission signature, the predetermined energy emission signature representing the predetermined identifying characteristic. In some embodiments, using the energy detected by the sensor 22 to determine the predetermined identifying characteristic further includes converting the energy detected by the sensor 22 into an image; displaying the image on a display 32 comprised in the wearable device 12 to allow the wearer to visually determine whether the image resembles the predetermined identifying characteristic, the image on the display and the predetermined identifying characteristic being configured to visually distinguish the second wearer from a non-wearer of compatible, wearable devices within a limited visibility environment.

In some embodiments, the wearable device 12 is at least part of an emergency responder uniform and the wearable device 12 further includes a retroreflective article embedded with a personal identification associated to the wearer. In some embodiments, the second energy source 36 includes the second retroreflective article affixed to the second wearable device 14. In some embodiments, the detecting the energy from the proximate, second energy source 36 further includes detecting reflected energy, the reflected energy resulting from the energy transmitted from the first energy source 20 and reflected by the second retroreflective article. In some embodiments, using the energy detected by the sensor 22 to determine the predetermined identifying characteristic further includes converting the energy detected by the sensor 22 to a personal identification; associating the personal identification to at least one of a time that the energy is detected by the sensor 22, a date that the energy is detected by the sensor 22, a location (e.g., distance between the spotter and the spotted) of the wearable device 12 during the time that the energy is detected by the sensor 22 and an orientation of the second wearable device 14 relative to the wearable device 12 when the energy is detected by the sensor 22; and transmitting the personal identification and the associated at least one of the time, the date, the location and the orientation to a database.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A wearable respiratory protective device configured to be worn by a wearer, the wearable respiratory protective device comprising:

a first energy source configured to transmit energy;
a sensor configured to detect energy from a proximate, second energy source of a compatible, second wearable respiratory protective device;
processing circuitry in communication with the first energy source and the sensor, the processing circuitry configured to use the energy detected by the sensor to determine a predetermined identifying characteristic associated to a second wearer of the second wearable respiratory protective device; and
a display in communication with the processing circuitry;
wherein the processing circuitry is configured to use the energy detected by the sensor to determine the predetermined identifying characteristic by being configured to convert the energy detected by the sensor into an image on the display, the image on the display allowing the wearer to visually determine whether the image resembles the predetermined identifying characteristic; and
wherein the predetermined identifying characteristic corresponds to a predetermined energy emission signature associated to the second wearer of the second wearable respiratory protective device.

2. The wearable device of claim 1, wherein the first energy source and the second energy source are configured to transmit at least one of electromagnetic (EM) radiation, near infrared (IR) light, ultraviolet (UV) radiation and ultrasonic waves.

3. The wearable device of claim 1, wherein the first energy source is configured to transmit the energy across a 360 degree range relative to the wearer of the wearable device.

4. The wearable device of claim 1, wherein the image on the display is configured to visually distinguish the second wearer from a non-wearer of compatible, wearable devices within a limited visibility environment.

5. The wearable device of claim 1, wherein the display is a heads-up display.

6. The wearable device of claim 1, wherein the wearable device is at least part of an emergency responder uniform and the wearable device further comprises a retroreflective article embedded with a personal identification associated to the wearer.

7. The wearable device of claim 6, wherein the predetermined identifying characteristic associated to the second wearer corresponds to a second personal identification embedded into a second retroreflective article affixed to the second wearable device.

8. The wearable device of claim 7, wherein:
the second energy source comprises the second retroreflective article affixed to the second wearable device; and
the sensor is configured to detect energy from the proximate, second energy source by being configured to:
detect reflected energy, the reflected energy resulting from the energy transmitted from the first energy source and reflected by the second retroreflective article.

9. The wearable device of claim 1, further comprising:
a transmitter in communication with the processing circuitry; and
wherein:
the processing circuitry is configured to use the energy detected by the sensor to determine the predetermined identifying characteristic by being configured to:
convert the energy detected by the sensor to a personal identification, associate the personal identification to at least one of a time that the energy is detected by the sensor, a date that the energy is detected by the sensor, and a location of the wearable device during the time that the energy is detected by the sensor; and
the transmitter is configured to wirelessly transmit the personal identification and the associated at least one of the time, the date and the location to a database.

10. The wearable device of claim 9, further comprising:
an orientation sensor in communication with the processing circuitry, the orientation sensor configured to detect an orientation of the second wearable device relative to the wearable device; and
wherein the processing circuitry is further configured to:
associate the personal identification to the orientation detected by the orientation sensor when the energy is detected by the sensor; and
cause the transmitter to transmit the orientation along with the personal identification and the associated at least one of the time, the date and the location to the database.

11. A method for a wearable respiratory protective device configured to be worn by a wearer, the method comprising:
providing a wearable respiratory protective device having a first energy source, a sensor and processing circuitry;
transmitting, via the first energy source, energy;
detecting, via the sensor, energy from a proximate, second energy source of a compatible, second wearable respiratory protective device; and
using, via the processing circuitry, the energy detected by the sensor to determine a predetermined identifying characteristic associated to a second wearer of the second wearable respiratory protective device;
wherein the first energy source and the second energy source are configured to transmit to a same predetermined energy emission signature, the predetermined energy emission signature representing the predetermined identifying characteristic; and
wherein using the energy detected by the sensor to determine the predetermined identifying characteristic further comprises:
converting the energy detected by the sensor into an image; and
displaying the image on a display comprised in the wearable respiratory protective device to allow the wearer to visually determine whether the image resembles the predetermined identifying characteristic, the image on the display and the predetermined identifying characteristic being configured to visually distinguish the second wearer from a non-wearer of compatible, wearable devices within a limited visibility environment.

12. The method of claim 11, wherein:
transmitting the energy further comprises transmitting at least one of electromagnetic (EM) radiation, near infrared (IR) light, ultraviolet (UV) radiation and ultrasonic waves; and
detecting the energy further comprises detecting at least one of electromagnetic (EM) radiation, near infrared (IR) light, ultraviolet (UV) radiation and ultrasonic waves.

13. The method of claim 11, wherein the wearable device is at least part of an emergency responder uniform and the wearable device further comprises a retroreflective article embedded with a personal identification associated to the wearer.

14. The method of claim 13, wherein:
the second energy source comprises a second retroreflective article affixed to the second wearable device;
the detecting the energy from the proximate, second energy source further comprises detecting reflected energy, the reflected energy resulting from the energy transmitted from the first energy source and reflected by the second retroreflective article; and
using the energy detected by the sensor to determine the predetermined identifying characteristic further comprises:
converting the energy detected by the sensor to a personal identification;
associating the personal identification to at least one of a time that the energy is detected by the sensor, a date that the energy is detected by the sensor, a location of the wearable device during the time that the energy is detected by the sensor and an orientation of the second wearable device relative to the wearable device when the energy is detected by the sensor; and
transmitting the personal identification and the associated at least one of the time, the date, the location and the orientation to a database.

15. A system comprising:
a wearable respiratory protective device configured to be worn by a wearer, the wearable device comprising:
a first energy source configured to transmit energy in a form of at least one of electromagnetic (EM) radiation, near infrared (IR) light, ultraviolet (UV) radiation and ultrasonic waves;
a sensor configured to detect energy from a proximate, second energy source of a compatible, second wearable respiratory protective device, the first energy source and the second energy source being configured to transmit a same predetermined energy emission signature, the predetermined energy emission signature representing the predetermined identifying characteristic;
a heads-up display in communication with the processing circuitry; and
processing circuitry in communication with the first energy source, the sensor and the heads-up display, the processing circuitry configured to:
use the energy detected by the sensor to determine a predetermined identifying characteristic associated to a second wearer of the second wearable respiratory protective device;
convert the energy detected by the sensor into an image; and
display the image on the display to allow the wearer to visually determine whether the image resembles the predetermined identifying characteristic, the image on the display and the predetermined identifying characteristic being configured to visually distinguish a second wearer of the second wearable respiratory protective device from a non-wearer of compatible, wearable devices within a limited visibility environment.

* * * * *